United States Patent [19]

Hayashi et al.

[11] Patent Number: 4,538,753

[45] Date of Patent: Sep. 3, 1985

[54] TAPE RECORDER

[75] Inventors: Hideki Hayashi; Satoshi Takagi; Yukio Ito; Sadayoshi Endo, all of Tokyo, Japan

[73] Assignee: Clarion Co., Ltd., Tokyo, Japan

[21] Appl. No.: 398,257

[22] Filed: Jul. 14, 1982

[30] Foreign Application Priority Data

| Jul. 16, 1981 | [JP] | Japan | 56-110057 |
| Jul. 16, 1981 | [JP] | Japan | 56-110058 |
| Jul. 16, 1981 | [JP] | Japan | 56-110059 |
| Jul. 16, 1981 | [JP] | Japan | 56-110060 |

[51] Int. Cl.$^3$ .............. G11B 15/10; G11B 15/32; G11B 19/02
[52] U.S. Cl. .............. 226/199; 360/72.2; 360/96.3
[58] Field of Search .......... 242/186, 201, 202, 203, 242/204, 198, 199, 200; 360/90, 96.3, 96.4, 105, 72.2, 74.4; 74/99 A, 104, 110

[56] References Cited

U.S. PATENT DOCUMENTS

| 3,421,637 | 1/1969 | Sofy | 74/110 X |
| 3,429,519 | 2/1969 | Staar | 242/201 X |
| 3,652,030 | 3/1972 | Nakano | 242/201 |
| 3,767,137 | 10/1973 | Richt et al. | 360/96.4 X |
| 3,806,666 | 4/1974 | Hashizume et al. | 360/96.4 X |
| 4,005,485 | 1/1977 | Opocensky | 360/105 X |
| 4,196,874 | 4/1980 | Ohara | 242/201 |
| 4,202,220 | 5/1980 | Matsumoto | 242/201 X |
| 4,212,438 | 7/1980 | Schatteman | 242/201 |
| 4,252,284 | 2/1981 | Suzuki | 242/204 X |
| 4,291,348 | 9/1981 | Pera | 360/96.4 |
| 4,380,031 | 4/1983 | d'Alayer de Costemore d'Arc | 242/201 X |

Primary Examiner—Harvey C. Hornsby
Assistant Examiner—Scott J. Haugland
Attorney, Agent, or Firm—Russell E. Hattis; Ralph R. Rath

[57] ABSTRACT

A fast-forwarding and rewinding levers operating mechanism in a tape recorder comprisig an FF (fast forward) lever element having formed therein a hook-shaped guide recess, a REW (rewinding) lever element superposed on the FF lever element and which has formed therein a hook-shaped recess so positioned in a direction opposite to said guide recess in the FF lever element as to intersect the latter guide recess, an oscillating member located under said FF and REW lever elements and having an oscillating portion provided at the intersection between said two guide recesses, and a transmission means to oscillate said oscillating member for a rotary medium to engage a reel base, said oscillating portion of the oscillating member being oscillated, by pressing said FF or REW lever element, to put said transmission means into action, thus revolving said reel base for FF or REW operation.

3 Claims, 17 Drawing Figures

FIG. 5
FIG. 6
FIG. 7
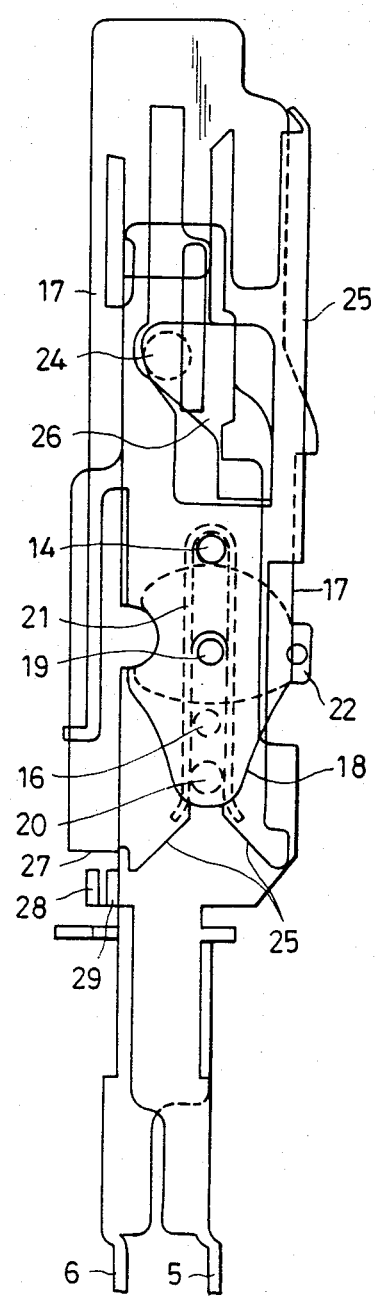
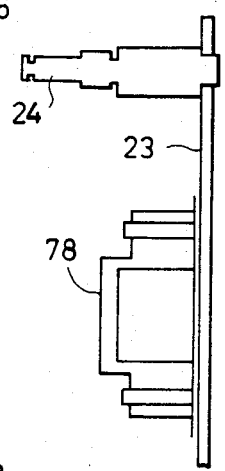
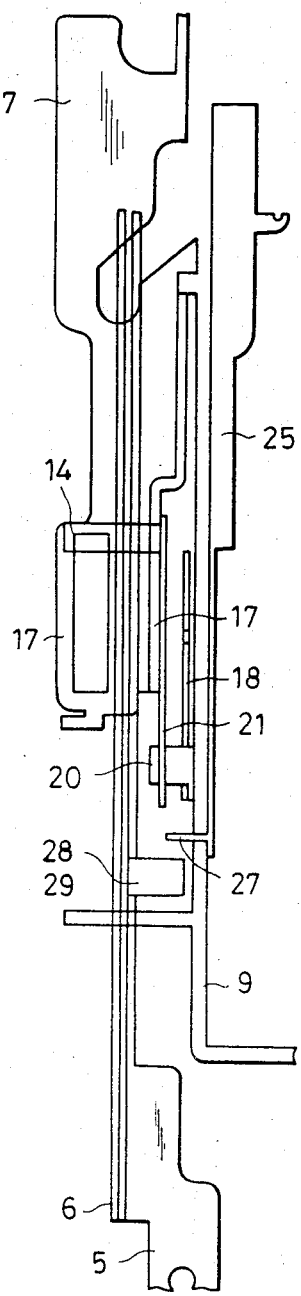

FIG. 12
FIG. 13
FIG. 14
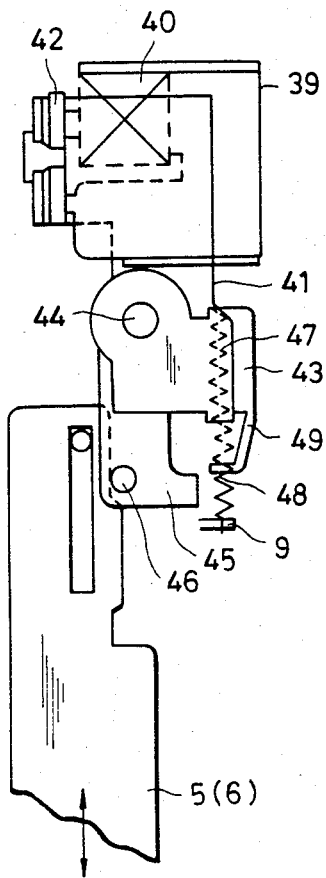
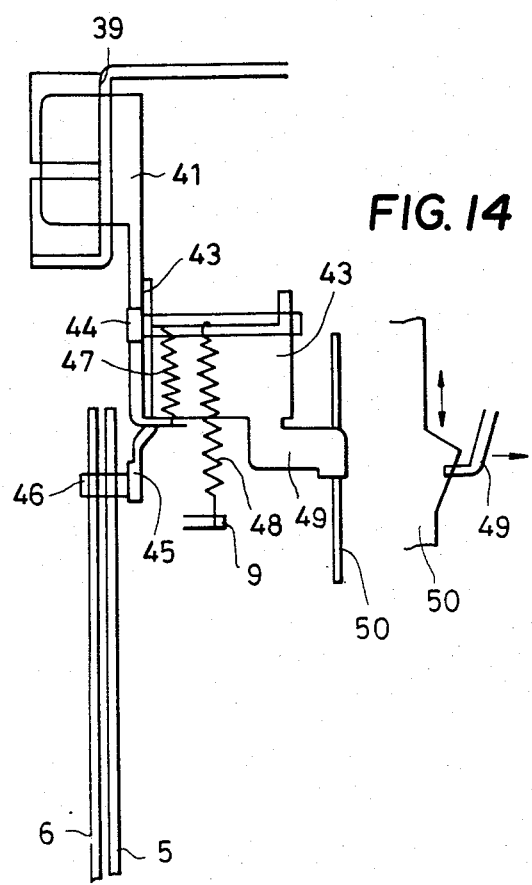

TAPE RECORDER

BACKGROUND OF THE INVENTION

1. Field of the Invention

The present invention relates to a tape recorder, and more particularly to an improved fast forward and rewind-mechanism in a tape recorder.

2. Description of the Prior Art

For a compact design of a tape recorder such as cassette tape player or the like, it has been proposed to effect the fast forward (FF) and rewinding (REW) of tape as well as the ejection of tape cassette by operating a single lever. A typical one of many different mechanisms of the prior art constructed so as to realize the above-mentioned conception is illustrated by way of example in FIG. 1.

In the Figure, the operating lever is generally indicated at the numeral 1; in this arrangement, the tape is fast forwarded or rewound by turning the lever 1 vertically. Also, pressing to the left as viewed in FIG. 1 the lever 1 from its initial position will cause the tape cassette to be ejected. However, this exemplary mechanism is disadvantageous in that the space w required for vertically turning the lever is large.

FIG. 2 shows another prior-art mechanism that has been proposed to overcome the above-mentioned drawbacks. In this arrangement, an FF lever 2 and REW lever 3 are provided separately from each other. This mechanism is so designed that when these levers are pushed separately from each other, an abutment 2A or 3A is caused to abut an oscillating member 4 which will be oscillated about a pin 5 in the direction of arrows s, thus creating either the FF or REW operation; also in this arrangement, the ejection of cassette tape is made by the oscillating member 4 which is caused to oscillate by pressing the FF and REW levers 2 and 3 simultaneously on the right hand end.

In this system, however, a space of escape S is required for the oscillating member 4 to escape in a direction opposite to the direction in which any one of the levers 2 and 3 is separately pressed, so that the ratio of effective stroke l with the operating stroke W is small. Further, since the abutment of the lever 2 or 3 is made to oscillate while being abutting the oscillating member, the space $w_1$ between the abutments 2A and 3A becomes wide; if it is intended to unreasonably reduce this space w, the operational load will disadvantageously be increased.

Also in a tape player such as cassette tape stereo player, when the FF or REW operation is intended while tape playing is being effected, it is necessary that the FF or REW mechanism including FF or REW idlers should be set only after the reproduction mechanism comprising a reproduction head or heads, pinch rollers and playing idlers is released from the tape under playing. Should the FF or REW mechanism be set before or at the same time as the reproduction mechanism is put out of operation, the tape reel rotating at a constant speed in the tape playing mode of operation will be abruptly applied with a force which causes the high-speed tape winding (FF or REW) with the result that not only a great load will be applied to the tape but also the drive system is likely to be damaged. To avoid this, the FF or REW mechanism must be set in operation only after the reproduction mechanism is completely put out of operation.

Further, a tape player is known in which during the FF or REW operation, a necessary signal, for example, an inter-music signal on a music tape is detected, then the FF or REW operation is canceled and the tape playing mode of operation is automatically restored.

As one example of such functions, an arrangement is well known that there is provided a core in a member which locks the FF and REW levers. By pressing the FF or REW lever, a switch provided as associated therewith is turned on to energize a holding plunger which will attract said core while a return spring provided so as to be forced in the direction of the attraction is actuated to attract the FF or REW lever which will be thus locked. When an inter-music signal is detected, said holding plunger is deenergized to release the core so that the returning force of the FF or REW lever which exceeds the force of said return spring will cause the lever to be returned to the initial position, whereby the tape player is automatically returned to the tape playing mode of operation.

However, the prior-art mechanism described above needs, in addition to the switch which energizes the holding plunger by means of pressing the FF or REW lever, a manual unlocking switch which is used to manually unlocking the lever during the operation of the holding plunger. For this reason, it is not possible to connect the inter-music signal detection circuit and holding plunger directly with each other, which makes it impossible to simplify the circuitry.

SUMMARY OF THE INVENTION

The present invention is proposed to overcome the above-mentioned drawbacks of the prior-art tape recorder, by providing a tape recorder comprising an FF (fast forward) lever element having formed therein a hook-shaped guide recess, a REW (rewinding) lever element superposed on said FF lower element and which has formed therein a hook-shaped recess so positioned in a direction opposite to said guide recess in the FF lever element as to intersect the latter guide recess, an oscillating member located under said FF and REW lever elements and having an oscillating portion provided at the intersection between said two guide recesses, and a transmission means to oscillate said oscillating member for a rotary medium to engage a reel base, said oscillating portion of the oscillating member being oscillated, by pressing said FF or REW lever element, to put said transmission means into action, thus revolving said reel base for FF or REW operation.

The above and other advantages and objects of the present invention will be apparent from the ensuing description made by way of example of the preferred embodiments constructed according to the present invention with reference to the drawings.

BRIEF DESCRIPION OF THE DRAWINGS

FIG. 5 is a plan view diagrammatically illustrating components disposed under the components of FIG. 3;

FIG. 6 is a side view of one format of a control member of the tape recorder which is driven by the mechanism consisting of the components shown in FIGS. 3, 4, 5 and 7;

FIG. 7 is a side view of the components of FIG. 5;

Figure 1:
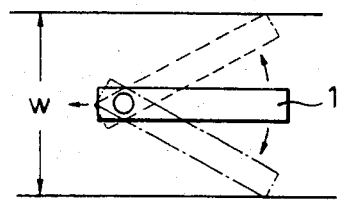
FIGS. 1 and 2 are schematic views of prior-art mechanisms, respectively.
Figure 2:
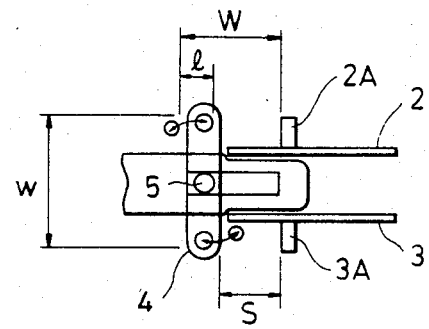
Figure 3:
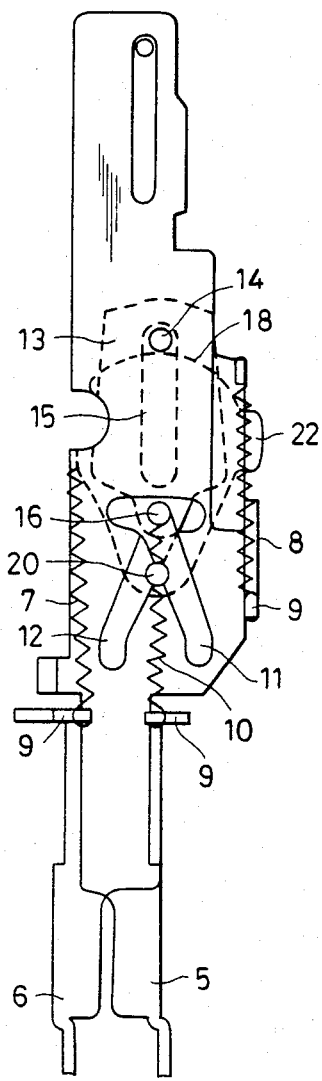
FIG. 3 is a plan view diagrammatically illustrating components disposed in an upper position of the fast-forwarding and rewinding levers operating mechanism embodying the invention.
Figure 4:
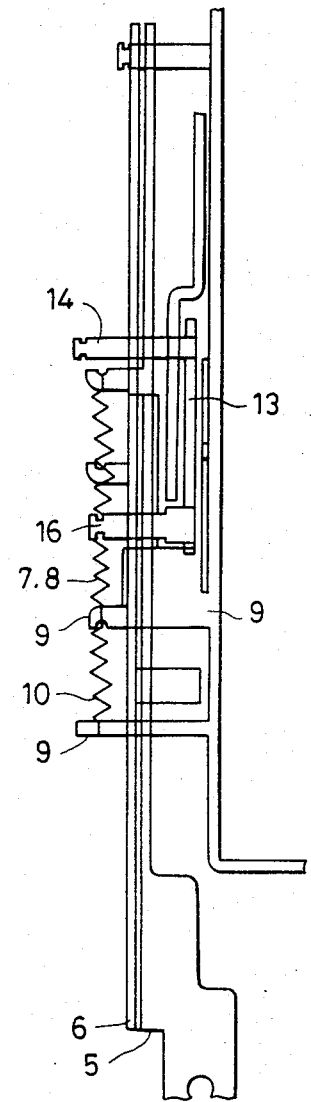
FIG. 4 is a side view of the components of FIG. 3.
Figure 8:
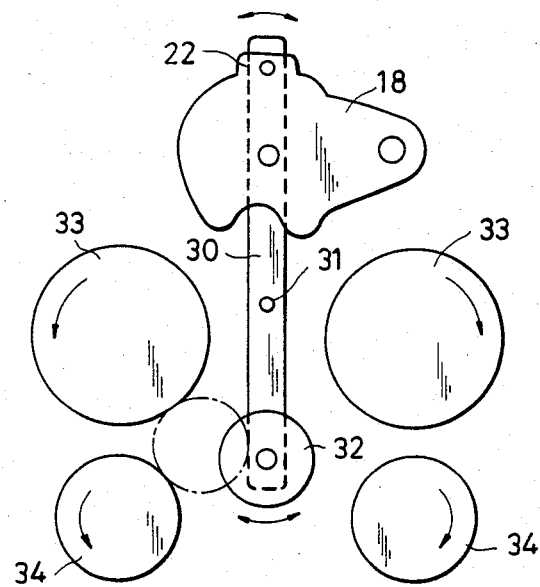
Figure 9:
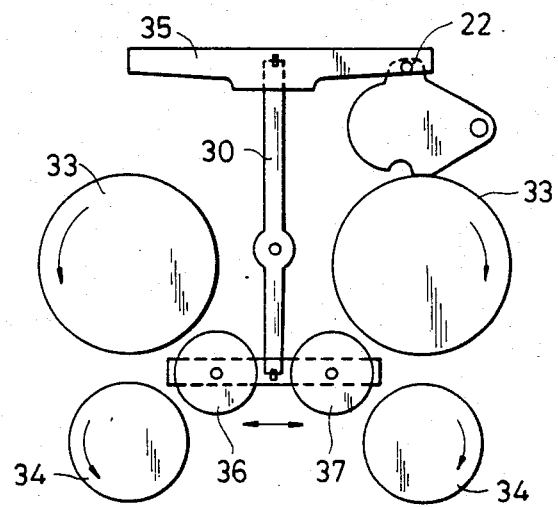
Figure 10:
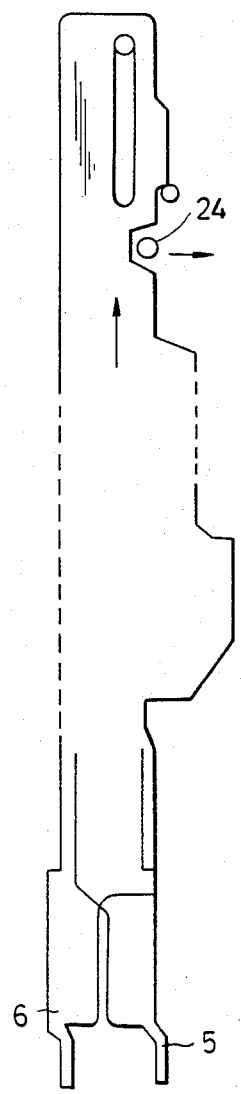
Figure 11:
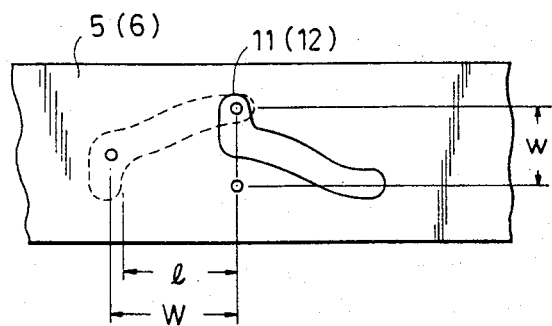
Figure 15A:
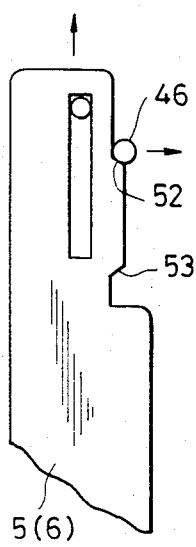
Figure 15B:
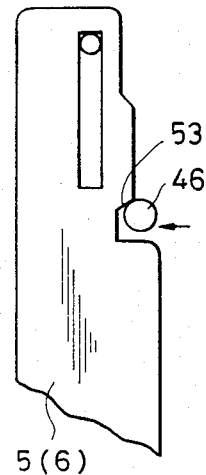
Figure 15C:
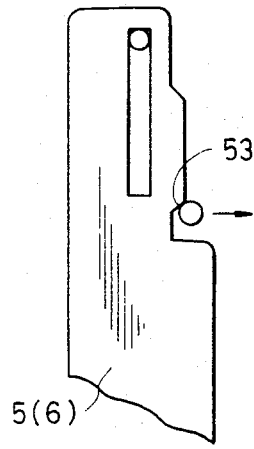

FIG. 8 diagrammatically shows a link mechanism to link a drive system of the tape recorder to and drive it with the mechanism consisting of the components of FIGS. 3, 4, 5 and 7;

FIG. 9 diagrammatically shows a modification of the link mechanism of FIG. 8;

FIG. 10 diagrammatically shows how an engagement pin of the control member of FIG. 6 is directly moved by the components of FIG. 3;

FIG. 11 shows guide recesses of a fast-forwarding lever or of a rewinding lever employed in the aforegoing embodiment;

FIG. 12 is a plan view diagrammatically illustrating a holding plunger mechanism of the tape recorded controlled by the components of FIG. 3;

FIG. 13 is a side view of the holding plunger mechanisn of FIG. 12;

FIG. 14 shows how an unlocking arm of the holding plunger mechanism of FIGS. 12 and 13 as related to a switching member for the automatic reverse; and, FIGS. 15(a) through 15(c) show how a locking pin of the holding plunger mechanism of FIGS. 12-13 as related to the fast-forwarding or rewinding lever of FIG. 3.

DETAILED DESCRIPTION OF THE PREFERRED EMBODIMENTS

Referring now to the drawings, FIGS. 3 through 7 diagrammatically show a fast-forwarding and rewinding levers operating mechanism embodying the invention which may be employed in a cassette tape recorder. In these Figures, the reference numerals 5 and 6 denote an FF (fast forward) and REW (rewinding) levers, respectively, which are so arranged as to be superposed on each other. The levers 5 and 6 are forced by means of return springs 7 and 8, respectively, to a frame 9 in the tape recorder so as to always be attracted in their longitudinal directions. The numerals 11 and 12 indicate hook-shaped guide recesses formed in said levers 5 and 6, respectively, and which are so disposed as to intersect each other like a letter X; 13 is an oscillating member which oscillates about a pin 14 in the lateral direction and which is located below said levers 5 and 6 and has a guide recess 15 formed therein and an oscillating pin 16. This oscillating pin 16 is fixed to the tip of said oscillating member 13 and guided, when the FF or REW lever 5 or 6 is pressed, by the X-like intersection formed between the hook-shaped guide recesses 11 and 12, thus oscillating about said pin 14 laterally. Also the oscillating pin 16 is forced by the spring 10 to the frame 9. The numeral 17 (FIG. 5) is a sliding member which is slidably mounted on the frame, and has a guide recess in which said pin 14 is slidably held. The numeral 18 is a second oscillating member located under said oscillating member 13 and which holds for oscillation about a pin 19 a second oscillating pin 20 provided at the tip. The numeral 21 is a U-shaped spring which serves to transmit the motion of the oscillating member 13 to the second oscillating memner 18; this spring 21 is engaged between the pin 14 and the second oscillating pin 20. Therefore, when the FF lever 5 or REW lever 6 is pressed, the oscillating pin 16 is oscillated laterally as guided by the intersection between the hook-shaped guide recesses 11 and 12. This motion of the oscillating pin 16 is transmitted to the second oscillating pin 20 which in turn will be oscillated laterally about the pin 19 so that a transmission 22 located at the end of the second oscillating member 18 is applied with the vertical motion.

The numeral 23 is a control member in the tape player supporting an engagement pin 24 and other parts such as magnetic head 78, pinch roller (not shown), etc. member provided with a control section 26 which is engaged with the upper portion of the engagement pin 24 and moves it laterally (the magnetic head, etc. are moved toward or away from the tape). Further, this second control member 25 is provided with an abutment 27 which is so arranged as to abut each of abutments 28 and 29 provided on the FF and REW levers, respectively; when the lever is pressed, the abutment 27 gets in contact with either of the abutments 28 and 29 and consequently is pushed by the abutment.

The above-mentioned components and parts are shown in the condition where the cassette tape play constructed according to the present invention and in which a cassette tape is loaded is in the tape playing mode of operation.

The lever mechanism as described above is operated as follows to effect the fast-forwarding or rewinding operation in the tape recorder which is in operation of tape playing such as reproduction of tape-recorded music:

By pressing the FF lever 5 or REW lever 6, the hook-shaped guide recess 11 or 12 is moved forward so that the intersection between them is correspondingly moved laterally. Thus the pin oscillating pin 16 is oscillated laterally about the pin 14. The actuation spring 21 engaged with the oscillating pin 16 is also oscillated laterally so that the oscillating pin 20 of the second oscillating member 18 will be oscillated laterally about the pin 19, thereby transmitting the vertical motion to the transmission 22.

The vertical motion transferred to the transmission 22 is transmitted to a link piece 30 (FIG. 8) located below the transmission 22 as a lateral motion with which the link piece 30 is moved about a pin 31 in the direction of arrow corresponding to the above-mentioned vertical motion. Since the link piece 30 has provided at the end thereof a rotary medium 32, such as idler, the vertical motion of the transmission 22 will cause the idler to move in the direction of arrow until it is pressed against a drive 33 (such as flywheel of capstan, etc.) and a reel base 34, thereby providing the FF or REW operation. Any other rotary medium such as gear or the like may be employed in place of said idler.

On the other hand, when the FF lever 5 or REW lever 6 is pressed, the abutment 28 or 29 of the lever 5 or 6, respectively, abuts said second control member 25 which will be pushed. As the result, the control section 26 (tapered portion) of the control member 23 causes the engagement pin 24 of the control member 23 to move rightward along the tapered portion so that the parts such as magnetic head and the like held on the control member 23 are released from the operation of tape playing and moved back. In this way, the tape on the reel base 34 is subject to fast feed in either FF or REW mode.

FIG. 9 shows a variation of the transmission mechanism. In the illustrated arrangement, there is interposed an intermediate link piece 35 between the transmission 22 and the link piece 30, and a pair of idlers 36 and 37 is provided at the end of the link piece 30, thereby providing the compact structure of the drive system.

FIG. 10 shows an example in which the engagement pin 24 of the control member 23 is moved back directly by means of the FF lever 5 or REW lever 6; in this case, the second control member 25 becomes unnecessary, thus permitting to simplify the mechanism.

According to the present embodiment, it is possible, by forming the hook-shaped guide recesses 11 and 12 in the FF lever 5 or REW lever 6 as shown in FIG. 11, to increase the effective stroke l (stroke along the slanted portion of the recess) with the operating stroke W (whole stroke); so the force of operation for switching can be reduced. Also since the space $w_1$ can be reduced, the compact structure can be attained. The corresponding increase of load can be accomodated by decreasing the slanted extent of the recess since the effective stroke l is great as mentioned above.

The fast-forwarding and rewinding levers operating mechanism of the invention may be also embodied so as to include a holding plunger mechanism to lock or unlock the levers 5 or 6 described above. FIGS. 12 through 15(a), 15(b) and 15(c) show such a holding plunger mechanism. In the Figures, the numeral 39 is a holding plunger, 40 is a solenoid, 41 is a sublocking member, and 42 is a core provided in a portion of the sub-locking member 41 which faces the solenoid. 43 indicates a locking member mounted coaxially by said sub-locking member 41 and a pin 44 and which has provided at the end 45 thereof a locking pin 46 for locking the FF lever 5 or REW lever 6. The numeral 47 is a holding spring for maintaining a spacing between the sub-locking member 41 and locking member 43. The holding spring 47 is so selected as to have a sufficient holding power to hold the FF or REW lever.

The reference numeral 48 indicates a return spring provided between the locking member 43 and frame 9 and which is used to attract the sub-locking member 41 toward the holding plunger 39. This return spring 48 is so selected as to have a strength with which the FF or REW lever cannot be held. The numeral 49 is a releasing arm provided on the locking member 43, 50 is a switching member for the automatic reverse, which functions to release the unlocking arm 49 of the locking member 43 in order to switch the pinch roller, idler, etc. (not shown) provided in the tape player to the forward or reverse side. The switching member 50 has a tapered portion 51 which acts, when the tape end is reached, in the direction of arrow to release the unlocking arm 49 in the direction of arrow. Further, the FF lever 5 or REW lever 6 has provided on the side face thereof a tapered portion 52 for unlocking the locking pin 46 and another tapered portion 53 for locking the locking pin 46, as shown in FIGS. 15(a), (b) and (c).

In the above-described arrangement, during the reproduction, the FF lever 5 or REW lever 6 is in a position where the locking pin 46 is in contact with the releasing tapered portion 52 as shown in FIG. 15(a), with the core and plunger being locked. By pressing the FF or REW lever in the direction of arrow in this condition, the locking pin 46 is moved, as guided by the tapered portion 52, to the right as indicated by arrow against the force of the spring 47, thus the lever is further pushed forward. As the lever is pushed to a further position as shown in FIG. 15(b), it will be moved, as guided by the locking tapered portion 53, to the left and locked. Thus, the previously mentioned FF or REW operation is effected.

When an inter-music signal is detected by a well-known prior art inter-music signal detecting circuit provided in the tape player, the holding plunger 39 is deenergized in response to the inter-music signal so that the plunger 39 will not be further attracted by the core 42 on the sub-locking member 41. Accordingly, the locking pin 46 is locked only with the force exerted by the return spring 48. However, the lever is always forced by the spring 7 or 8 as having been described; the force of the return spring 48 is smaller than that of the spring 7 or 8. Therefore, the lever is moved, as guided by the locking tapered portion 53 of the lever, to the right as indicated by arrow so that the lever will be unlocked and returned to its initial position. In this way, the reproduction is resumed for the tape portion following the detected inter-music signal.

When it is desired to unlock the lever while the holding plunger 39 is being energized, the locking pin 46 is guided to the right by the releasing tapered portion 52 by pressing the lever opposite to the locked one. Thus, the lever is unlocked against the force of the holding spring 47 between the lever and the sub-locking member 41 held by the core 42.

In the aut-reverser system, when the tape end is reached during the FF or REW operation, the tapered portion 51 of the switching member 50 is actuated to move in the direction of arrow the unlocking arm 49 of the locking member 43 on which the locking pin 46 is provided, thus unlocking the lever and resuming the reproduction operation. Also in the one-way system, mechanical detection can be effected by providing a tapered portion on a member which is actuated with the mechanical detection or the like.

With an arrangement that the force of the holding spring 47 forcing the sub-locking member 41 and locking member 43 is applied to the coaxial pin 44, not to the support frame thereof, it is possible to prevent the resistance when the locking member 43 rotates about the pin 44 in the direction of unlocking, under the effect of the pressure of the holding spring 47 at time of unlocking.

The holding power of the holding plunger 39 varies greatly depending upon the voltage applied, but it can be maintained constant since the lever is held through the holding spring 47 by the plunger 39. Thus, since the force for mechanically unlocking the lever can be made constant, the lever can be easily unlocked.

As apparent from the foregoing explanation, according to the present embodiment, a sub-locking member is provided in addition to the locking member. A spring is provided for each of these locking and sub-locking members. With different holding powers of these springs, it is possible to eliminate the manual unlocking switch. Accordingly, since it is possible to directly connect the inter-music signal detection circuit with the holding plunger, thus permitting to simplify the circuitry. Even if a switch is provided for muting or the other purpose, it has only to disconnect only the audio circuit; there is no necessity of accomplishing a strictly precise timing with the operation of the tape player mechanisms.

In the embodiments of the present invention having been described in the foregoing, the plunger core is provided as a separate member on the sub-locking member, but it is illustrated only by way of example. If the lever can be properly attached to the holding plunger when energization is made, a core of ferromagnetic material may be formed integral with the plunger, not as a separate member.

As having been described in the foregoing, the drawbacks of the prior-art can be eliminated by providing according to the present invention a tape recorder comprising an FF (fast forward) lever element having formed therein a hook-shaped guide recess, a REW (rewinding) lever element superoposed on said FF lever element and which has formed therein a hook-shaped guide recess so positioned in a direction opposite to said guide recess so the FF lever element so as to intersect the latter guide recess, an oscillating member located under said FF and REW lever elements and having an oscillating portion provided at the intersection between said two guide recesses, and a transmission means to oscillate said oscillating member for a rotary medium to engage a reel base, said oscillating portion of the oscillating member being oscillated, by pressing said FF or REW lever element, to put said transmission means into action, thus revolving said reel base for FF or REW operation.

We claim:

1. A fast-forwarding and rewinding operating mechanism in a tape recorder having a drive mechanism for a tape reel comprising:
    a fast-forward (FF) lever element having a hook-shaped guide recess;
    a rewinding (REW) lever element superposed on said FF lever element and having a corresponding hook-shaped guide recess in partial overlapping relation;
    an oscillating member adjacent said levers pivoted about a fixed pivot and having an oscillating portion extending through both of said guide recesses; and,
    transmission means connected to said oscillating member and moved with said oscillating member for producing a driving engagement between said drive mechanism and said tape reel in response to movement of one of said levers.

2. A fast-forwarding and rewinding operating mechanism in a tape recorder as set forth in claim 1, further including:
    locking means to lock said FF and REW lever elements in a predetermined position, said locking means comprising:
    a holding plunger;
    a locking member;
    a sub-locking member;
    a first spring provided between said locking member and sub-locking member and having a biasing force to hold said lever elements in said predetermined position; and,
    a second spring between said locking member and said sub-locking member to attract said sub-locking member;
    said FF or REW lever element being returned to the initial position against the holding power of said second spring when said sub-locking member is released by said holding plunger in the conditions where said FF or REW lever element is pressed and locked.

3. A fast-forwarding and rewinding levers operating mechanism in a tape recorder as set forth in claim 2, wherein said FF or REW lever element has provided thereon a locking tapered portion with which said lever element is locked by means of said locking member, and a releasing taper portion to unlock sid lever element.

* * * * *